UNITED STATES PATENT OFFICE.

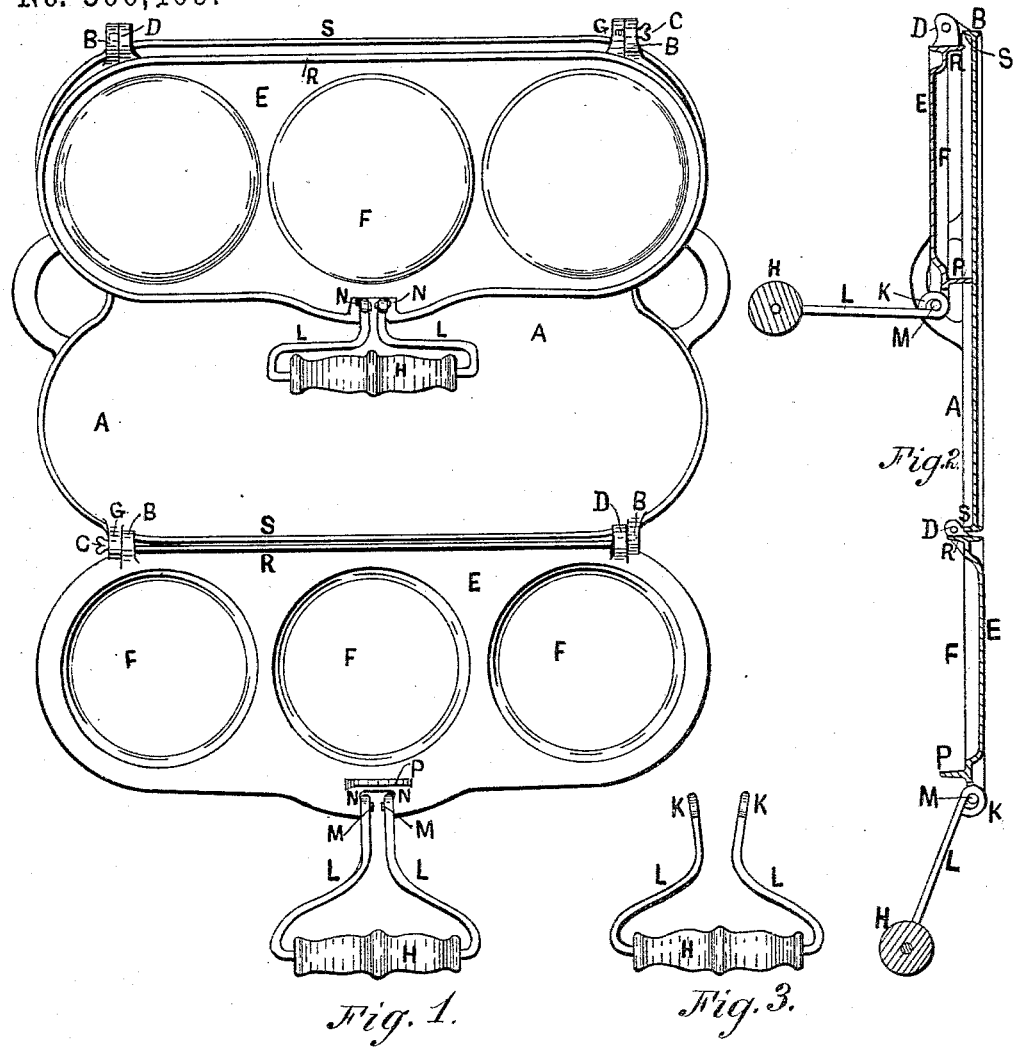

JONATHAN V. TAYLOR, OF BOSTON, MASSACHUSETTS.

CAKE-GRIDDLE.

SPECIFICATION forming part of Letters Patent No. 300,409, dated June 17, 1884.

Application filed September 29, 1883. (No model.)

*To all whom it may concern:*

Be it known that I, JONATHAN V. TAYLOR, of Boston, in the county of Suffolk and State of Massachusetts, have invented certain new and useful Improvements in Cake-Griddles, of which the following is a specification.

The object of my invention is to provide a cheap, simple, and convenient cake-griddle which shall obviate several objections found in those heretofore constructed, wherein the batter is received into shallow pans or cavities formed within a hinged portion, so as to permit the cakes to be turned over and upon the main portion by swinging over the said hinged portion upside down, as usual; and it consists in the construction, combination, and arrangement of the several parts of griddle, as hereinafter more fully described, and set forth in the claims.

Figure 1 represents a plan of a cake-griddle constructed according to my invention. Fig. 2 represents a lateral central section of the same. Fig. 3 represents a view of one handle removed.

A represents the central or main base part of the griddle, having at one or both edges, and near each end thereof, projecting lugs B, provided with holes to receive a thumb-screw, C, at one end, and the opposite end adapted to receive a pivot, D, cast upon the hinged wing portion E, which being inserted into the said hole provided in the lug B, the opposite end of the said wing portion E having a similar or corresponding lug, G, a thumb-screw. C, is inserted or screwed therein. The said wing portion E is thus hinged to the main portion A, so as to be swung open to receive the batter to be placed within the shallow circular pans or depressions F, and when sufficiently cooked may be instantly turned therefrom and upon the main portion A by means of the swinging handle H, having spring-wire connecting loop-eyes K and spring connecting side portions, L, which engage with small notches N at each side of the pivots M, provided upon the outer edge of the said hinged wing-piece E, whereby the spring of the handle side portions, L, will serve, in connection with the notches N, to hold the said handle H in an upright position and permit the hinged wing portion E to be swung over thereby, and thus remove the cakes contained in the said shallow pans F by jarring the same therefrom by means of the projection P striking upon the said main portion A, as shown at the top of Figs. 1 and 2.

It will be seen and understood that when the said wing portion E is turned over upon the main portion A the melted fat or butter remaining in the shallow pans F is conducted by means of the rib or flange R into or upon the main portion A, which is provided with a projecting rib or flange, S, whereby the fat or other unctuous substance employed in cooking the griddle-cakes may be prevented from running from the wing portion E upon the stove when turning the same over, as would be the case if the said flange R were not provided.

I have shown a wing-piece hinged to each side or opposite edges of the main portion A; but a single wing-piece may be employed with a narrower main portion, if desired.

It will be seen and understood that the said wing portion E is provided at its free or outer edge with an opening or notch, each side of which is provided with a short pin or projecting pivot, M, and that the ends of the spring side portions, L, of the handle are formed with eyes K, either one of which may be first placed upon one of the pivots M, and then the opposite side portion, L, sprung inwardly against the former one, so as to permit its eye K to be passed over and upon the opposite pivot, M, whereby the said handle is hinged or pivoted within the notch of the wing-piece, so it may be easily connected thereto or removed therefrom for transportation, and when so connected and in use for the purpose of swinging the wing-piece over upon the main portion it cannot accidentally become disconnected from such operation, and will remain in an upright position when turned in either direction by such formation and frictional contact of the pivotal portions, as above described, and shown in the several views of the drawings.

The griddle-pans F may be made of any desired number and size to suit the requirements, and of any material desired or heretofore employed for the purpose.

Having thus described my invention, what I claim is—

1. The hinged wing-piece E, having the straight rib R arranged so as to fall inside of the rib of the main portion when folded together, substantially as shown and described, as and for the purposes set forth.

2. The handle H, having spring side portions, L, provided with eyes K, in combination with the wing-piece E, provided with the notches N and pivots M, substantially as described, as and for the purposes set forth.

3. The hinged wing-piece E, provided with notches N and short pivots M, adapted to engage with the eyes K of the handle, substantially as described, as and for the purposes set forth.

JONATHAN V. TAYLOR.

Witnesses:
SYLVENUS WALKER,
CHAS. S. GOODING.